Dec. 3, 1957
M. P. BIRCH
2,815,141
DISC HARROW TRANSPORT
Filed Feb. 4, 1954
2 Sheets-Sheet 1
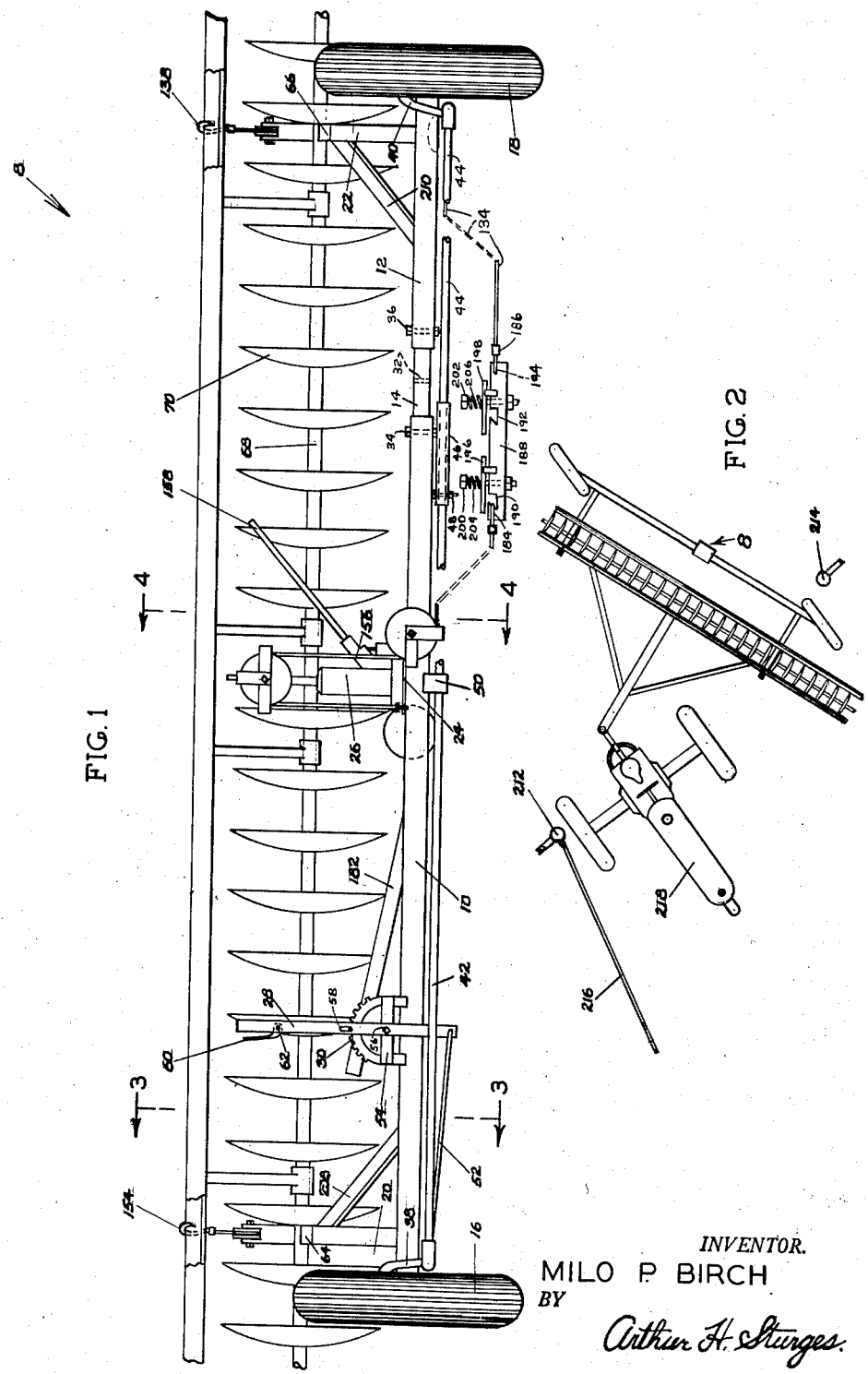
INVENTOR.
MILO P. BIRCH
BY
Arthur H. Sturges
ATTORNEY

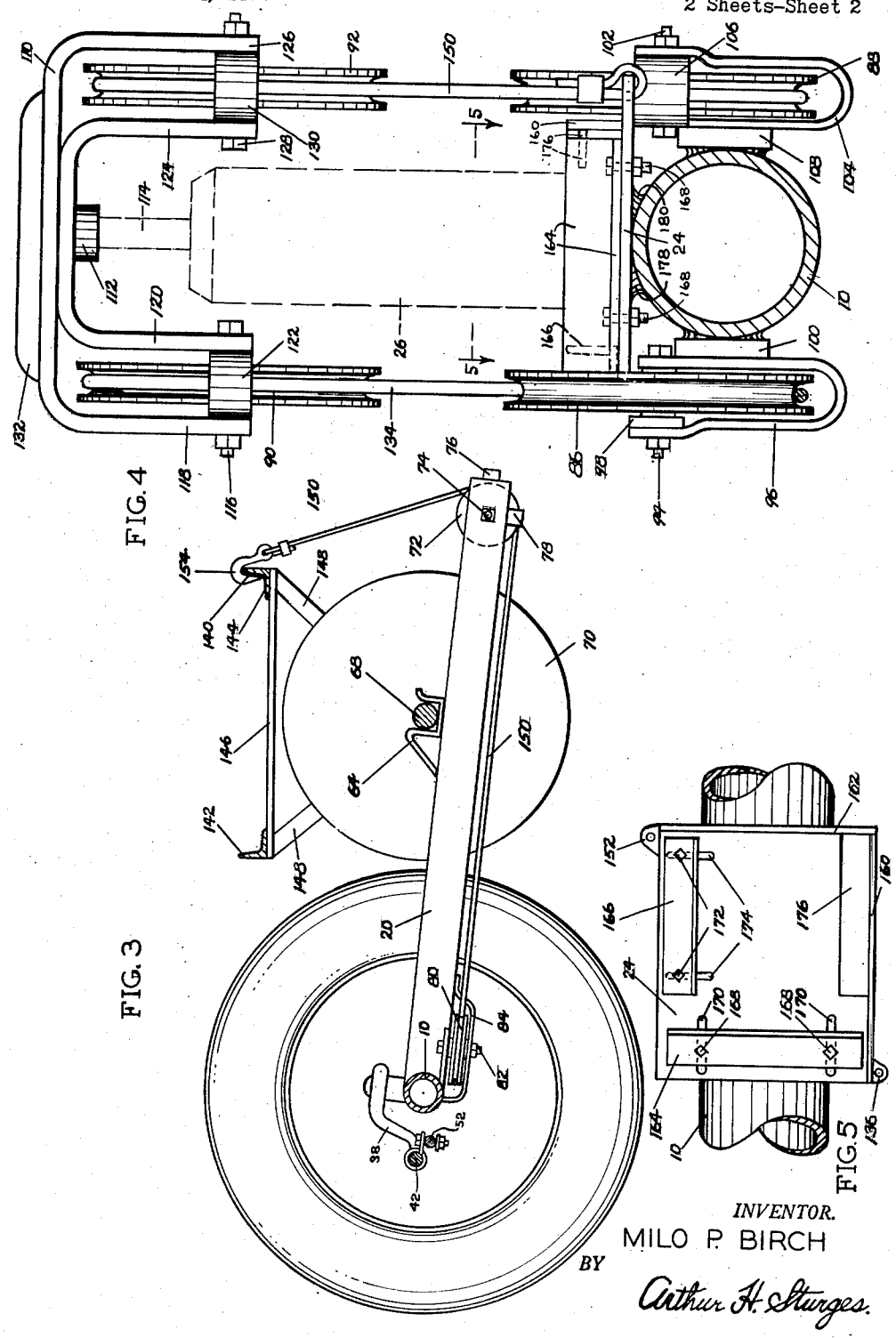

United States Patent Office 2,815,141
Patented Dec. 3, 1957

2,815,141

DISC HARROW TRANSPORT

Milo P. Birch, Cleghorn, Iowa

Application February 4, 1954, Serial No. 408,125

4 Claims. (Cl. 214—375)

This invention relates to transporting devices for agricultural implements and particularly heavy equipment such as disc harrows where the sharp edges of the discs provide the ground engaging elements, and in particular an elongated telescoping axle having ground engaging wheels pivotally mounted on the ends with means for picking up and suspending a disc harrow as a unit and also with means for adjusting the positions of the ground engaging wheels whereby the harrow and transporting device are adapted to be turned to substantially a longitudinal position to facilitate towing the harrow through gates and narrow lanes.

The purpose of this invention is to provide means for transporting a disc harrow with the discs suspended above the ground and wherein the discs are adapted to be turned so that the harrow may be towed endwise.

A disc harrow, owing to the construction and weight thereof, is very cumbersome, and consequently, it is difficult to move a disc harrow from one field or farm to another. For this reason many harrows remain in the field from one season to another, resulting in excessive wear due to rust and corrosion, and in some instances erosion and soil washed by heavy rains and the like partially buries the harrows, making it very difficult to reclaim the harrows in the spring. Furthermore, in moving a disc harrow from one location to another not only damages fields, walks, roadways and lawns, but also damages the sharp edges of the discs.

With these thoughts in mind this invention contemplates a carrier or transporting device with which the discs are elevated to positions above the ground whereby the disc is transported on conventional ground engaging wheels.

A conventional disc harrow is also comparatively wide and, therefore, it is difficult to move a harrow through a gate or along a relatively narrow lane or roadway. For this reason the transporting device of this invention also includes means for turning the harrow to substantially a longitudinal position whereby it may be carried through a gate or narrow roadway with ease.

The object of this invention is, therefore, to provide means for forming a transporting device for a disc harrow wherein the discs may readily be elevated and suspended in spaced relation to the ground.

Another object of the invention is to provide a transporting device for a disc harrow in which the harrow may readily be turned to substantially a longitudinal position.

Another important object of the invention is to provide a disc harrow transport in which a comparatively heavy harrow may be elevated to a carrying position above the ground by a single operator.

It is yet another object of the invention to provide a disc harrow transport that may readily be attached to or removed from a disc harrow.

A further object of the invention is to provide an improved disc harrow transport that is adapted to be adjusted to receive harrows of different sizes.

A still further object of the invention is to provide an arrangement of cables and pulleys for use on a disc harrow carrier wherein the harrow is adapted to be elevated by a hydraulic cylinder or jack operated by a hand lever.

And a still further object is to provide a carrier for picking up and transporting a disc harrow in which means is provided for turning the harrow to substantially a longitudinal position and in which the carrier is of a simple and economical construction.

With these and other objects and advantages in view the invention embodies an elongated telescoping axle with wheels mounted on the ends, with means for turning the wheels to angularly disposed positions, and with manually actuated means for elevating the discs to carrying positions in spaced relation to the ground upon which the device is positioned.

Other features and advantages of the invention will appear from the following description taken in connection with the drawings, wherein:

Figure 1 is a rear elevational view showing the disc harrow transporting device of this invention with a disc suspended in an elevated position therein and showing cable adjusting elements for the operating cables of the device removed from the structure of the transporting device.

Figure 2 is a plan view showing the disc harrow transporting device attached to a tractor with ground engaging wheels of the device turned to facilitate passing through a gate and also showing the device passing through posts of a gate.

Figure 3 is a cross section through the device taken on line 3—3 of Figure 1, the parts being shown on an enlarged scale.

Figure 4 is a cross section through the device taken on line 4—4 of Figure 1, also with the parts shown on an enlarged scale, and illustrating the manually actuated jack and pulleys over which the cables are trained.

Figure 5 is a plan view taken on line 5—5 of Figure 4, illustrating the hydraulic jack mounting platform which is positioned on the telescoping axle, the parts being shown on a slightly reduced scale in comparison to that of the parts shown in Figure 4.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification the same reference characters are used to designate the same parts and elements throughout, and in which the numeral 8 refers to the invention in its entirety, numerals 10 and 12 sections of a tubular telescoping beam providing an axle, numeral 14 a tube upon which the sections 10 and 12 are slidably mounted, numerals 16 and 18 wheels mounted on the ends of the axle, numeral 20 an arm or beam extended from the section 10 of the axle and adapted to carry one side of the disc harrow, numeral 22 an arm or beam extended from the section 12 and adapted to carry the opposite portion of the harrow, numeral 24 a platform upon which a hydraulic jack 26 is positioned, and numeral 28 a hand lever positioned to coact with a segmental rack 30 for adjusting the positions of the ground engaging wheels.

The sections 10, 12 and 14 of the axle are provided with spaced openings 32 through which bolts 34 and 36 extend thereby providing means for adjusting the length of the axle to correspond with disc harrows of different sizes.

The wheels 16 and 18 are provided with arms 38 and 40 which are connected to sections 42 and 44, respectively, of a radius rod, and the sections 42 and 44 are adjustably connected with a sleeve 46 that is provided with spaced openings through which bolts 48 are extended. By this means the length of the radius rod is adjusted to compensate for changes in the length of the axle. The radius rod is supported from the axle with a hanger or bearing 50 and a tie rod 52 extends from the end of the section 42 to the lower end of the hand lever 28, which is pivotally mounted on a bracket 54 with a pin 56. The rack 30 is positioned on the bracket 54 and a pawl 58, actuated by a handle 60 pivotally mounted on the hand lever 28 with a pin 62, is positioned to engage the teeth of the rack to hold the hand lever and wheels in adjusted positions.

The beams 20 and 22 extended from the sections 10 and 12 of the telescoping axle are provided with U-shaped sockets 64 and 66, respectively, that are positioned to receive a shaft 68 of a disc harrow, as shown in Figure 3, the beams being positioned to extend between the discs 70 on the shaft. Also as shown in Figure 3, the ends of the beams 20 and 22 are bifurcated and pulleys 72 are rotatably mounted by bolts 74 in the bifurcated ends. The ends of the beams are provided with guards 76 and 78 to retain cables on the pulleys. The opposite ends of the beams are provided with horizontally disposed pulleys 80 which are rotatably mounted on bolts 82 and the lower ends of the bolts are held in straps 84 which also provide guards for retaining the cables on the pulleys.

The cables, which extend from the beams 20 and 22 to the platform 24 at the center and upon which the jack 26 is positioned, travel on opposite sides of the telescoping axle and, as shown in Figure 4, the cables are trained over lower pulleys 86 and 88 and upper pulleys 90 and 92. The lower pulley 86 is rotatably mounted with a bolt 94 in a U-shaped bracket 96 and the bracket is supported from the platform 24 with a strut 98 and from the section 10 of the axle with a block 100 that is welded to the section 10 of the axle. The lower pulley 88 is rotatably mounted by a bolt 102 in a U-shaped bracket 104 and the bracket is supported from the platform 24 by a strut 106 and from the section 10 of the axle with a block 108 that is welded to the axle.

The upper pulleys are mounted in a yoke 110 that is positioned on a saddle 112 on the upper end of a shaft 114 extended from the jack 26. The pulley 90 is rotatably mounted by a bolt 116 is depending arms 118 and 120 at one side of the yoke, and the lower ends of the arms are connected with guards 122. The pulley 92 is similarly mounted in the lower ends of depending arms 124 and 126 with a bolt 128 and the lower ends of the arms are connected with a guard 130. The upper part of the yoke is provided with a reinforcing rib 132.

As illustrated in Figures 1 and 4, a cable 134, which is secured to an eye 136 on one corner of the platform 24, extends upwardly over the upper pulley 90, downwardly around the lower pulley 86, laterally to the horizontally disposed pulley 80 on the beam 22, along the beam to the pulley 72 which provides guide means for the cable, and upwardly with a hook 138 on the end of the cable secured over an upwardly extended leg 140 at one side of the harrow frame. The disc harrow frame includes angle bars 142 and 144 connected with cross bars 146 and supported from the shaft 68 with struts 148.

A cable 150, which is positioned on the opposite side of the telescoping axle, and which is connected to an eye 152 at one corner of the platform 24, extends upwardly over the upper pulley 92, downwardly around the lower pulley 88, laterally to and around the horizontally disposed pulley 80 of the beam 20, along the beam and around the pulley or guide means 72 thereof, from which the cable extends upwardly with a hook 154 secured over the leg 140 of the angle bar 144.

With the parts assembled in this manner upward travel of the saddle of the jack carries the yoke 110 upwardly drawing on the cables whereby with the hooks over the frame of the disc the discs are elevated by the beams 20 and 22 to the position shown in Figure 3.

Pressure may be supplied to the jack by suitable means, however, in the design shown, fluid is supplied under pressure by a pump 156 that is actuated by a crank or lever 158.

The jack 26 may also be secured to the platform 24 by suitable means and, as shown in Figure 5, the platform is provided with a side wall 160 and an end wall 162 against which the jack may be secured by clamping angle bars 164 and 166, the angle 164 being held by bolts 168 extended through the lower leg of the angle bar and through slots 170 in the platform, and the angle 166 being held by bolts 172 which extend through the lower leg of the angle bar and through slots 174 in the platform. By this means jacks of different types and sizes may be secured in operative positions upon the platform.

The platform 24 is also provided with a plate 176 below which an edge of a base of a jack may be held, the plate coacting with the angle bars 164 and 166 to rigidly clamp the jack in position. The platform is secured to the upper surface of the section 10 of the telescoping tube by welding as indicated at the points 178 and 180.

The section 10 of the telescoping tube is also provided with a tube 182 which extends in an upwardly inclined position as shown in Figure 1, thereby providing storage for the crank or lever 158 when the said crank or lever is not in use.

The cables 134 and 150 are provided with adjusting or slack take-up devices, as illustrated in Figure 1 wherein the ends of the cable 134, which are provided with loops 184 and 186, are secured in a block 188. The loop 184, on one end of the cable is positioned in slots 190 and 192 in the upper surface of the block, and the end on which the loop 186 is positioned is passed through an aperture 194 in the opposite end of the block. Cover plates 196 and 198, pivotally mounted by bolts 200 and 202, respectively, and urged downwardly by springs 204 and 206, hold the loop 184 in the slots. The distance between the slots corresponds with the distance between the discs of a conventional disc harrow so that the length of the cable may be adjusted to correspond with the number of discs used on a harrow.

With the parts formed and assembled in this manner the length of the transporting device is adjusted until the arms 20 and 22, which are supported laterally by diagonal braces 208 and 210, extend between discs of the harrow, and with the hooks of the cables secured over the harrow frame, the jack is actuated to elevate the discs as illustrated in Figure 3.

In transporting a harrow through a gate, as illustrated in Figure 2, the wheels are adjusted by the hand lever 28 to a position such as shown in Figure 2, wherein the device is adapted to pass between posts 212 and 214 of a gate 216, the harrow being extended to one side of a tractor, as indicated by the numeral 218. With the wheels 16 and 18 adjusted to vertical planes parallel to planes extended through wheels of a towing tractor the harrow will follow a tractor, the draw-bar of which is attached to a tongue extended from the harrow. The transporting device may, therefore, be adjusted so that a disc harrow may be carried on a roadway or through a lane, or the like.

From the foregoing specification it will become apparent that the invention disclosed will adequately accomplish the functions for which it has been designed, and in an economical manner, and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. A disc harrow carrier comprising an elongated telescoping axle, wheels, means to pivotally mount the wheels on ends of the axle for adjustably shifting said wheels in generally parallel and vertical planes having a selected angularity with respect to the axle, spaced beams extended from the axle and positioned perpendicularly thereto, in vertical planes, a cylinder having a piston therein mounted on said axle, a piston rod extended from the piston and cylinder, and cables trained over pulleys on the carrier and adapted to be connected to a disc harrow positioned on said beams, pulleys on the beams positioned at points remote from the wheels providing guide means for the cables and said guide means being disposed on the beams on the sides of said beams which are remote from the wheels, said cables being adapted to be actuated by the piston rod for elevating the beams to suspend the disc harrow above the ground upon which the carrier is positioned.

2. In a disc harrow transporting device, the combination which comprises an elongated telescoping axle, wheels, means to pivotally mount the wheels on ends of the axle for adjustably shifting said wheels in generally parallel and vertical planes having a selected angularity with respect to the axle, arms extended from the wheel mountings, a radius rod having means therein for adjusting the length thereof connected to the arms of the wheel mountings, a hand lever mounted on said axle, means connecting the hand lever to the radius rod for actuating the wheel adjusting means, spaced beams extended from the telescoping axle, means on the beams for receiving the shaft of a disc harrow, a platform positioned on the telescoping axle, a jack positioned on said platform, cables connected to the platform and trained over pulleys on the jack, axle, and beams, pulleys on the beams positioned at points remote from the wheels providing guide means for the cables and said guide means being disposed on the beams on the sides of said beams which are remote from the wheels, and hooks on the cables for connecting ends of the cables to a harrow on the beams whereby upon extension of the jack the cables elevate the beams and harrow carried thereby.

3. In a disc harrow transporting device, the combination which comprises an elongated tubular axle, means for adjusting the length of the axle, wheels, means to pivotally mount the wheels on ends of the axle for adjustably shifting said wheels in generally parallel and vertical planes having a selected angularity with respect to the axle, a radius rod, means connecting the ends of the radius rod to the wheels, means for adjusting the length of the radius rod, a hand crank for actuating the radius rod to adjust the angular positions of the wheels in vertical planes in relation to the axle, beams having shaft receiving sockets thereof extended from the axle, a platform positioned on the axle, a hydraulic jack positioned on the platform, a yoke carried by said hydraulic jack, pulleys rotatably mounted on the yoke, axle, and beams, cables connected to the platform, and trained over the pulleys said pulleys on the beams being positioned at points remote from the wheels providing guide means for the cables and said guide means being disposed on the beams on the sides of said beams which are remote from the wheels, and hooks on the ends of the cables for attaching the cables to a frame of a disc harrow carried by the beams whereby upon actuating the jack the beams and a harrow carried thereby are elevated, and means for adjusting the length of at least one of the cables.

4. In a disc harrow transporting attachment, the combination which comprises an elongated axle, wheels positioned at the ends of the axle, means to pivotally mount the wheels on the axle for adjustably shifting the wheels in generally parallel and vertical planes having a selected angularity with respect to the axle, arms extending from the wheel mountings, a radius rod pivotally connected to extend ends of the arms, a hand lever mounted on the axle, means connecting the hand lever to the radius rod, spaced beams extended from the axle, a hydraulic jack mounted on the axle, cables attached to the axle and having hooks on extended ends, guide means for the cables disposed on the beams at points remote from the wheels and also disposed on the beams on the sides of the beams which are remote from the wheels, and means operatively connecting the cables to the hydraulic jack whereby extension of the jack with the hooks of the cables secured on a disc harrow carried on the beams elevates the beams and disc harrow.

References Cited in the file of this patent

UNITED STATES PATENTS

| | | |
|---|---|---|
| 555,143 | Wicks | Feb. 25, 1896 |
| 608,167 | Alshouse | Aug. 2, 1898 |
| 1,901,183 | McKahin | Mar. 14, 1933 |
| 2,202,931 | Strandlund | June 4, 1940 |
| 2,377,410 | Field | June 5, 1945 |
| 2,469,622 | Acton | May 10, 1949 |
| 2,479,099 | Cerny | Aug. 16, 1949 |
| 2,577,885 | Gay | Dec. 11, 1951 |
| 2,641,885 | Ireland | June 16, 1953 |